United States Patent
Kimura et al.

(10) Patent No.: US 11,101,760 B2
(45) Date of Patent: Aug. 24, 2021

(54) ELECTRIC MOTOR CONTROL DEVICE

(71) Applicant: Mitsubishi Electric Corporation, Tokyo (JP)

(72) Inventors: Tetsuya Kimura, Tokyo (JP); Yasushi Otsuka, Tokyo (JP); Eiji Yokoyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/758,052

(22) PCT Filed: Dec. 20, 2017

(86) PCT No.: PCT/JP2017/045734
§ 371 (c)(1),
(2) Date: Apr. 22, 2020

(87) PCT Pub. No.: WO2019/123573
PCT Pub. Date: Jun. 27, 2019

(65) Prior Publication Data
US 2021/0194402 A1    Jun. 24, 2021

(51) Int. Cl.
| | | |
|---|---|---|
| G05B 5/00 | (2006.01) | |
| H02P 23/04 | (2006.01) | |
| G05B 11/36 | (2006.01) | |
| H02P 29/40 | (2016.01) | |
| H02P 23/20 | (2016.01) | |
| H02P 23/14 | (2006.01) | |
| H02P 6/10 | (2006.01) | |

(52) U.S. Cl.
CPC ............ *H02P 23/04* (2013.01); *G05B 11/36* (2013.01); *H02P 6/10* (2013.01); *H02P 23/14* (2013.01); *H02P 23/20* (2016.02); *H02P 29/40* (2016.02)

(58) Field of Classification Search
CPC .......... H02P 23/04; H02P 23/20; H02P 29/40; H02P 23/14; H02P 6/10; G05B 11/36; G05B 11/42; G05B 13/047
See application file for complete search history.

(56) References Cited

U.S. PATENT DOCUMENTS

2019/0227505 A1*  7/2019 Burgwinkel ......... G05B 13/047

FOREIGN PATENT DOCUMENTS

JP          08-137503 A        5/1996

OTHER PUBLICATIONS

International Search Report and Written Opinion dated Mar. 20, 2018 for PCT/JP2017/045734 filed on Dec. 20, 2017, 6 pages including English Translation of the International Search Report.

(Continued)

*Primary Examiner* — Karen Masih
(74) *Attorney, Agent, or Firm* — Xsensus LLP

(57) ABSTRACT

Provided is an electric motor control device including: a speed controller configured to calculate an operation amount directed to an electric motor, and output the operation amount; a first filter configured to use the operation amount as an input to calculate a first correction amount in accordance with a first transfer function from the operation amount to the first correction amount, and output the first correction amount; a second filter configured to use a rotational speed as an input to calculate a second correction amount in accordance with the second transfer function from the rotational speed to the second correction amount, and output the second correction amount; and a control command calculator configured to add the first correction amount and the second correction amount to one another, to thereby calculate a control command, and output the control command.

9 Claims, 10 Drawing Sheets

(56) References Cited

OTHER PUBLICATIONS

Yuki, K., et al., "Vibration Control of a 2 Mass Resonant System by the Resonance Ratio Control," T.IEE Japan, vol. 113-D, No. 10, 1993, pp. 1162-1169 (See English Abstract).

* cited by examiner

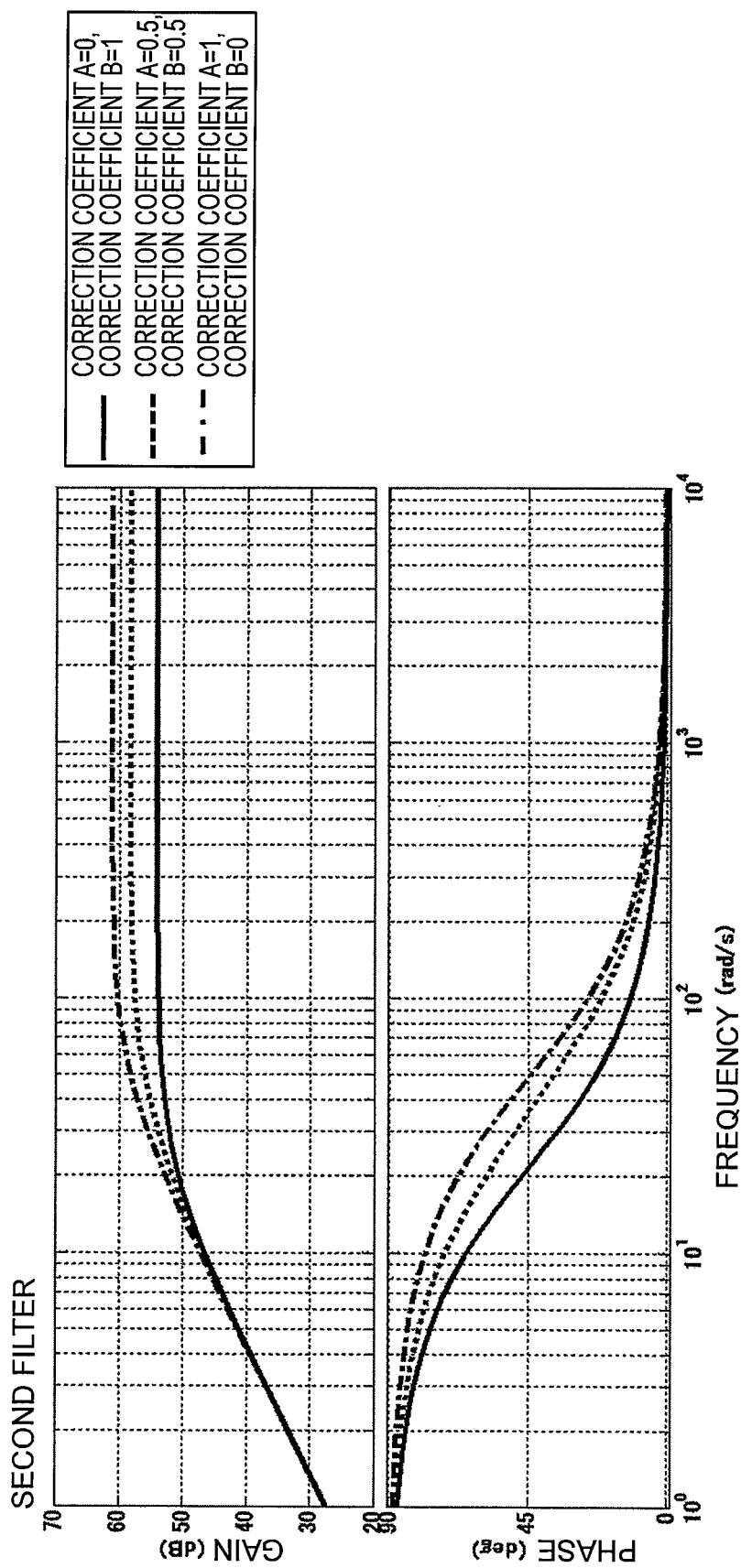

ELECTRIC MOTOR CONTROL DEVICE

CROSS-REFERENCE TO RELATED APPLICATION

The present application is based on PCT filing PCT/JP2017/045734, filed Dec. 20, 2017, the entire contents of which are incorporated herein by reference.

TECHNICAL FIELD

The present invention relates to an electric motor control device configured to control an electric motor.

BACKGROUND ART

When an electric motor and a load are connected to one another through, for example, a shaft having low rigidity, the electric motor and the load resonate. Therefore, when speed control for an electric motor is designed, it is required to perform the design in consideration of the resonance. In this case, when the design of the speed control fails, the resonance is excited, and as a result, it is also feared that the electric motor and the load may be damaged.

As a related-art electric motor control device that addresses such problems, there has been proposed a control device configured to suppress the vibration caused by the resonance (see, for example, Patent Literature 1). Specifically, the related-art control device includes a control system configured to quickly estimate a load torque and execute feedback control so that the load torque and a torque command directed to the electric motor match each other. Moreover, in the related-art control device, resonance ratio control of apparently changing inertia of the electric motor so as to achieve stability is applied to the control system. Further, in the related-art control device, a first-order lag filter is added to the control system to which the resonance ratio control is applied, to thereby improve control performance, and further enable logical determination of a time constant of the first-order lag filter. With such a configuration of the control device, an effect of suppressing the vibration caused by the resonance is achieved.

CITATION LIST

Patent Literature

[PTL 1] JP H8-137503 A

SUMMARY OF INVENTION

Technical Problem

In the related-art control device, as described above, the time constant of the first-order lag filter added to the control system to which the resonance ratio control is applied can logically be determined, but a method of setting a time constant of an observer configured to estimate the load torque is not clear. Thus, in the related-art control device, when the resonance of the electric motor and the load occurs, the vibration caused by the resonance may not quickly be damped depending on the setting of the time constant of the observer of the control system.

The present invention has been made in order to solve the above-mentioned problem, and therefore has an object to provide an electric motor control device capable of quickly damping the vibration caused by the resonance even when the electric motor and the load resonate.

Solution to Problem

An electric motor control device according to one embodiment of the present invention is a control device configured to control an electric motor in accordance with a control command, and includes: a speed controller configured to calculate an operation amount directed to the electric motor from a rotational speed command for the electric motor and a rotational speed of the electric motor acquired by a speed acquisition device configured to acquire the rotational speed, and output the operation amount; a first filter configured to use the operation amount output by the speed controller as an input to calculate a first correction amount in accordance with a first transfer function from the operation amount to the first correction amount, and output the first correction amount; a second filter configured to use the rotational speed acquired by the speed acquisition device as an input to calculate a second correction amount in accordance with a second transfer function from the rotational speed to the second correction amount, and output the second correction amount; and a control command calculator configured to subtract the second correction amount output by the second filter from the first correction amount output by the first filter, to thereby calculate and output the control command, wherein a time constant of the first transfer function in the first filter and a time constant of the second transfer function in the second filter are set so as to maximize a damping coefficient used in a denominator polynomial of a transfer function from the operation amount to the rotational speed.

Advantageous Effects of Invention

According to the present invention, it is possible to provide the electric motor control device capable of quickly damping the vibration caused by the resonance even when the electric motor and the load resonate.

BRIEF DESCRIPTION OF DRAWINGS

FIG. 17B is a graph for showing the frequency characteristic of the second filter in the third embodiment of the present invention.

DESCRIPTION OF EMBODIMENTS

Now, an electric motor control device according to each of exemplary embodiments of the present invention is described with reference to the accompanying drawings. In the illustration of the drawings, the same components are denoted by the same reference symbols, and the overlapping description thereof is herein omitted.

First Embodiment

Figure 1:
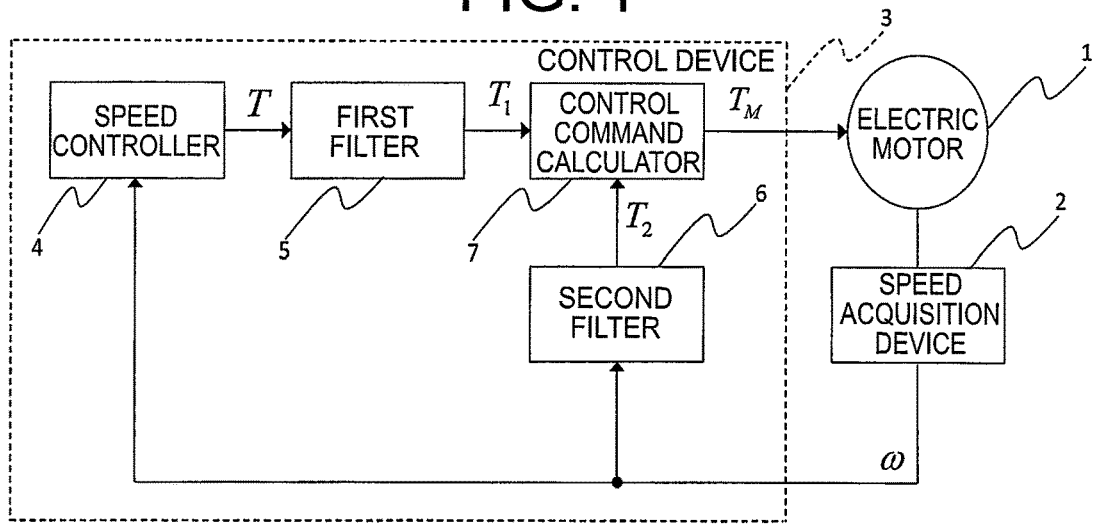
FIG. 1 is a block diagram for illustrating a configuration of an electric motor system including an electric motor control device according to a first embodiment of the present invention.

FIG. 1 is a block diagram for illustrating a configuration of an electric motor system including an electric motor control device 3 according to a first embodiment of the present invention. In FIG. 1, the electric motor control system includes an electric motor 1, a speed acquisition device 2, and the control device 3. The control device 3 is configured to control the electric motor 1.

The type of the electric motor 1 is not particularly limited, and specific examples of the electric motor 1 include a permanent magnet synchronous machine and an induction motor. In the first embodiment, it is assumed that the electric motor 1 is connected to a resonating load. Moreover, when the control device 3 according to the first embodiment is applied to, for example, an elevator, conceivable examples of the load include a rope wound around a traction machine including the electric motor and a car suspended by the rope.

The speed acquisition device 2 acquires a rotational speed $\omega$ of the electric motor 1, and outputs the acquired rotational speed $\omega$. As a specific configuration example of the speed acquisition device 2, the speed acquisition device 2 is configured as follows.

That is, the speed acquisition device 2 uses, for example, an optical encoder, a resolver, or a magnetic sensor to detect a rotational position or a rotational angle of the electric motor 1, and calculates the rotational speed $\omega$ of the electric motor 1 based on a result of the detection, to thereby obtain the rotational speed $\omega$. When the speed acquisition device 2 is configured in this manner, the speed acquisition device 2 calculates the rotational speed $\omega$ through, for example, time-differentiation of the rotational position or the rotational angle. Moreover, the speed acquisition device 2 may be configured to use a low-pass filter to smooth the rotational speed $\omega$ in order to remove noise caused by the time-differentiation. Further, the speed acquisition device 2 may be configured to calculate the rotational speed $\omega$ every period set in advance, or may include a configuration for measuring time, and be configured to calculate the rotational speed $\omega$ every certain rotational angle set in advance.

The speed acquisition device 2 is not limited to the above-mentioned configuration example, and may be configured to directly detect the rotational speed $\omega$ of the electric motor 1, or may be configured to calculate the rotational speed $\omega$ of the electric motor 1 by detecting the rotational acceleration of the electric motor 1 and time-integrating the rotational acceleration. As described above, the speed acquisition device may be configured in any manner as long as the speed acquisition device 2 can acquire the rotational speed $\omega$ of the electric motor 1.

The control device 3 controls the electric motor 1 in accordance with a control command described later. Specifically, the control device 3 controls the rotational speed $\omega$ of the electric motor 1. The control device 3 is implemented by, for example, a microcomputer for executing calculation processing, a read only memory (ROM) for storing data such as program data and fixed-value data, and a random access memory (RAM) capable of updating and sequentially rewriting stored data.

The control device 3 includes a speed controller 4, a first filter 5, a second filter 6, and a control command calculator 7.

The speed controller 4 calculates an operation amount T directed to the electric motor 1 from a rotational speed command directed to the electric motor 1 and the rotational speed $\omega$ acquired by the speed acquisition device 2, and outputs the calculated operation amount T. Specifically, the speed controller 4 calculates the operation amount T directed to the electric motor 1 in accordance with a control method described later so that the rotational speed $\omega$ matches the rotational speed command, and outputs the calculated operation amount T.

In this state, the rotational speed command is a target value of the rotational speed $\omega$ of the electric motor 1. Moreover, the operation amount T is generally a torque command or a current command. As the control method for the speed controller 4, various control methods can be used, but the P control, the PI control, or the PID control is generally often used.

The first filter 5 uses the operation amount T output by the speed controller 4 as an input to calculate a first correction amount $T_1$ in accordance with a first transfer function described later, and outputs the calculated first correction amount $T_1$.

The second filter 6 uses the rotational speed ω acquired by the speed acquisition device 2 as an input to calculate a second correction amount $T_2$ in accordance with a second transfer function described later, and outputs the calculated second correction amount $T_2$. A detailed description is later given of the first filter 5 and the second filter 6.

The control command calculator 7 subtracts the second correction amount $T_2$ output by the second filter 6 from the first correction amount $T_1$ output by the first filter 5 to calculate a torque command $T_M$, which is an example of the control command directed to the electric motor 1, and outputs the calculated torque command $T_M$.

When the control command directed to the electric motor 1 is a torque command, the torque command is generally converted to a current command. Moreover, a current controller (not shown) executes current control so that a current of the electric motor 1 matches the current command, to thereby calculate a voltage command for controlling a voltage of the electric motor 1. Further, an electric power converter (not shown) applies a voltage to the electric motor 1 in accordance with the voltage command calculated by the current controller.

As the above-mentioned electric power converter, an inverter that converts a voltage supplied from a power supply to an AC voltage having a variable voltage and a variable frequency is generally used. Moreover, specific examples of the electric power converter include an inverter device formed of a converter configured to covert an AC voltage to a DC voltage and an inverter configured to convert the DC voltage converted by the converter to an AC voltage and a matrix converter configured to directly convert an AC voltage to an AC voltage having a variable voltage and a variable frequency. The above-mentioned configurations of the current controller and the electric power converter are only examples, and the current controller and the electric power converter may be configured in any manner.

When the control device 3 is configured to control the rotational position of the electric motor 1 in addition to the rotational speed ω of the electric motor 1, a position controller (not shown) is additionally provided at an upper level of the speed controller 4. The position controller calculates the rotational speed command input to the speed controller 4 so that the rotational position of the electric motor 1 matches a rotational position command for controlling the rotational position. In this case, the speed controller 4 uses the rotational speed command input from the position controller to calculate the operation amount T. As the control method for the position controller, various control methods can be used, but the P control, the PI control, or the PID control is generally often used.

Figure 2:
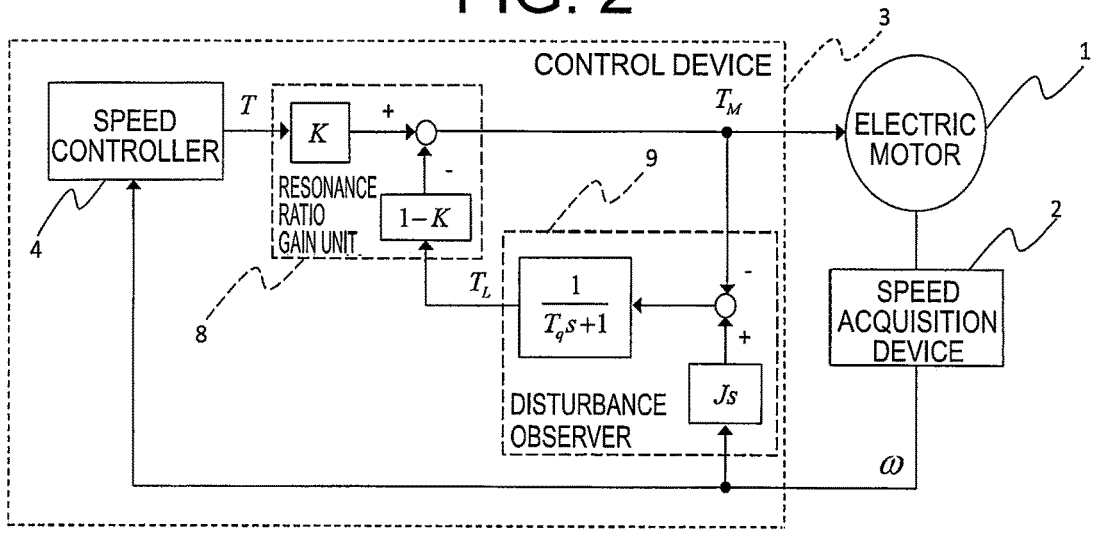
FIG. 2 is a block diagram obtained before equivalent transformation is applied to the block diagram of FIG. 1.

A description is now given of the first filter 5, the second filter 6, and the control command calculator 7. FIG. 2 is a block diagram obtained before an equivalent transformation is applied to the block diagram of FIG. 1. In this state, the control device 3 according to the first embodiment employs a control system to which the resonance ratio control is applied.

In FIG. 2, a disturbance observer 9 uses the torque command $T_M$, the rotational speed ω of the electric motor 1, and a model of the electric motor 1 to estimate a load torque $T_L$ acting on the electric motor 1.

In general, the load torque $T_L$, which is an output of the disturbance observer 9, is not multiplied by a coefficient, and is directly added to the torque command in disturbance suppression control.

Meanwhile, the load torque $T_L$, which is the output of the disturbance observer 9, is multiplied by a coefficient of 1-K, and is then fed back, and the operation amount T, which is the output of the speed controller 4, is multiplied by a coefficient of K, as appreciated from the configuration of a resonance ratio gain unit 8, in the resonance ratio control. As a result, the moment of inertia of the electric motor 1 can apparently be changed, and a frequency ratio between an anti-resonance frequency and a resonance frequency can thus be changed.

In FIG. 2, J represents the moment of inertia of the electric motor 1, namely, the model of the electric motor 1, $T_q$ represents a time constant that determines an estimation band of the disturbance observer 9 in the resonance ratio control, K represents a resonant ratio coefficient, and s represents a Laplacian operator.

The coefficient K is a coefficient that determines a resonance ratio, and is used to change the resonance frequency. The time constant $T_q$ is a constant that determines responsiveness of the disturbance observer 9. As the time constant $T_q$ decreases, higher responsiveness can be achieved, and higher disturbance suppression performance can consequently be provided. However, when the time constant $T_q$ is reduced, the control is sensitive to a measurement noise contained in the rotational speed ω of the electric motor 1, and the responsiveness and the measurement noise are thus in a trade-off relationship.

In FIG. 2, a case in which the disturbance observer 9 is configured to use a minimum-order observer to estimate the load torque $T_L$ is illustrated as an example, but the disturbance observer 9 may be configured to use a full-order observer to estimate the load torque $T_L$.

It is possible to derive, from the block diagram of FIG. 2 for illustrating the resonance ratio control, a relationship among the operation amount T, which is the output of the speed controller 4, the rotational speed ω of the electric motor 1, which is the output of the speed acquisition device 2, and the torque command $T_M$, which is the output of the control command calculator 7. As a result, a block diagram of FIG. 3 is obtained.

Figure 3:
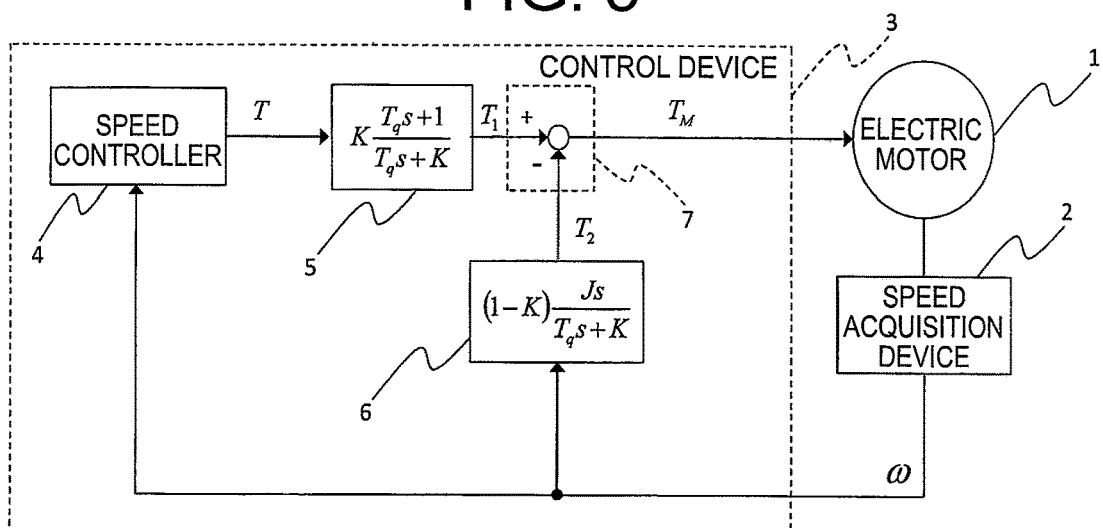
FIG. 3 is a block diagram obtained by applying equivalent transformation to the block diagram of FIG. 1.

FIG. 3 is a block diagram obtained by applying the equivalent transformation to the block diagram of FIG. 1. As illustrated in FIG. 3, a characteristic of the first filter 5 is defined by the first transfer function from the operation amount T, which is the input, to the first correction amount $T_1$, which is the output. Moreover, a characteristic of the second filter 6 is defined by the second transfer function from the rotational speed ω, which is the input, to the second correction amount $T_2$, which is the output.

In this state, in the first embodiment, there is provided such a design for the coefficient K as to satisfy K<1. As a result, the moment of inertia J of the electric motor 1 apparently increases, and as a result, the following two effects are provided.

The first effect is an effect of suppressing a peak of the resonance. The resonance of the electric motor 1 and the load can be suppressed by suppressing the peak of the resonance. As a result, the load can stably be operated.

The second effect is a reduction in a difference between inertia of the electric motor 1 and inertia of the entirety including inertia of the load connected to the electric motor 1, and as a result, the controlled object seen from the speed controller 4 can be considered as a single body of inertia. The inertia of the load is often larger than the inertia of the electric motor 1, and hence, when the controlled object cannot be considered as a single body of inertia, it is difficult to evaluate stability of the control. However, when the controlled object can be considered as a single body of inertia, the stability of the control can easily by evaluated, and the stability of the control can be achieved.

As described above, when K<1, the first filter 5 is, for example, a phase lag compensation filter, and the second filter 6 is, for example, a differential filter. In this case, as illustrated in FIG. 3, the control command calculator 7 is formed of a subtractor configured to subtract the output of the second filter 6 from the output of the first filter 5, to thereby calculate the torque command $T_M$.

Figure 4:
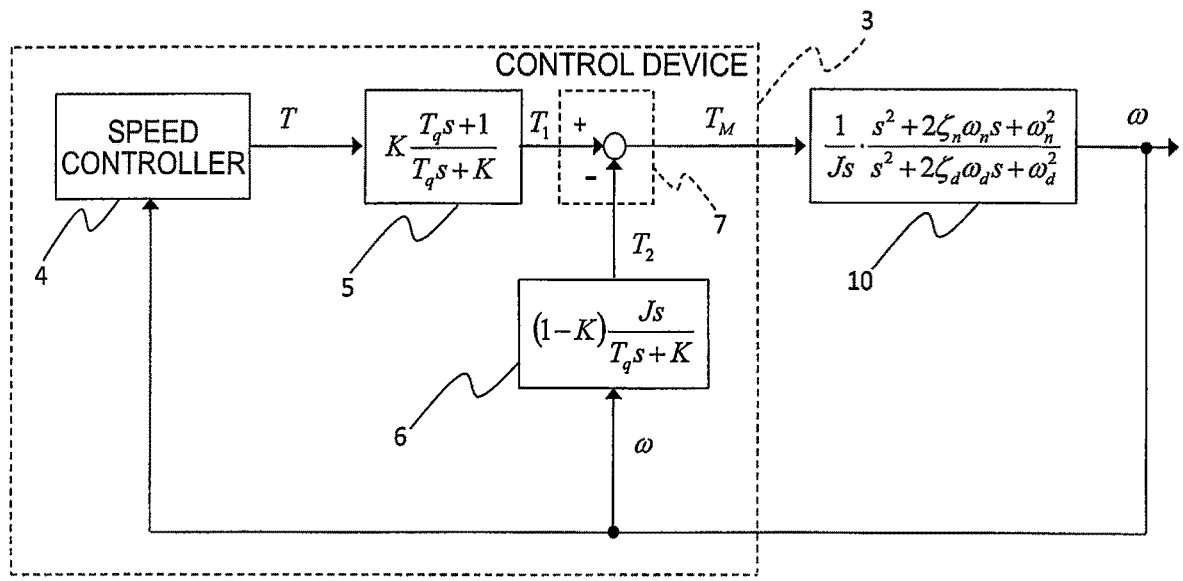
FIG. 4 is a block diagram for illustrating a model of the electric motor and a load together with the control device of FIG. 3.

A case in which the controlled object seen from the control device 3 is the electric motor 1 connected to the resonating load is now considered. FIG. 4 is a block diagram for illustrating a model of the electric motor 1 and the load together with the control device 3 of FIG. 3.

In FIG. 4, $\omega_n$ represents an anti-resonance frequency of the controlled object 11, $\omega_d$ represents a resonance frequency of the controlled object 11, and $\zeta_n$ and $\zeta_d$ represent damping coefficients of the controlled object 11.

In FIG. 4, in place of the electric motor 1 and the speed acquisition device 2 illustrated in FIG. 3, the controlled object 10 is illustrated. A characteristic of the controlled object 10 is defined by a transfer function from the torque command $T_M$ to the rotational speed $\omega$. In this state, a model having one anti-resonance frequency and one resonance frequency is used as an example, but a model of a higher order, namely, a model having a higher-order vibration mode may be used.

Figure 5:
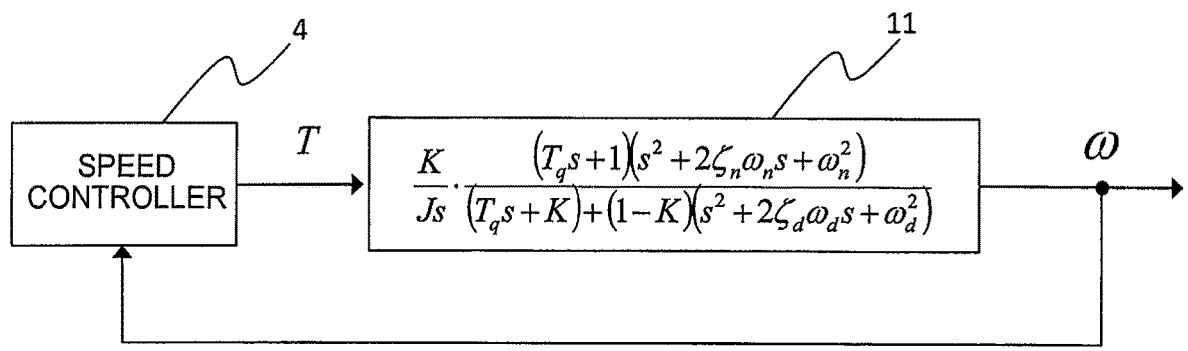
FIG. 5 is a block diagram obtained by applying equivalent transformation to the block diagram of FIG. 4.

Then, a transfer characteristic from the operation amount T, which is the output of the speed controller 4, to the rotational speed $\omega$ of the electric motor 1 is obtained by applying equivalent transformation to the block diagram of FIG. 4, and as a result, a block diagram of FIG. 5 is obtained.

FIG. 5 is a block diagram obtained by applying the equivalent transformation to the block diagram of FIG. 4. As appreciated from FIG. 5, through the equivalent transformation, the controlled object of the speed controller 4 can be considered as a controlled object 11 in place of the controlled object 10 of FIG. 4. A characteristic of the controlled object 11 is defined by a transfer function from the operation amount T, which is the output of the speed controller 4, to the rotational speed $\omega$ of the electric motor 1.

As described above, it is appreciated that the coefficient K is a coefficient that apparently changes the moment of inertia J of the electric motor 1. Moreover, it is appreciated that a numerator of the transfer function of the controlled object 11, namely, an anti-resonance characteristic seen from the speed controller 4 does not change. Meanwhile, it is appreciated that a denominator of the transfer function of the controlled object 11, namely, a resonance characteristic seen from the speed controller 4 can suitably be determined by the time constant $T_q$ of the disturbance observer 9 when the coefficient K is determined. That is, the resonance characteristic of the controlled object 11 seen from the speed controller 4 can suitably be changed by appropriately determining the time constant $T_q$.

In this state, the coefficient K is a coefficient that determines how close the inertia of the electric motor 1 and the overall inertia of the electric motor 1 and the load are to each other as described above in the second effect. Therefore, a desired ratio between the inertia of the electric motor 1 and the overall inertia of the electric motor 1 and the load is determined, and the coefficient K is set in accordance with the ratio. Ideally, the inertia of the electric motor 1 and the overall inertia of the electric motor 1 and the load can be considered as approximately the same as one another by infinitely reducing the coefficient K. However, in consideration of a fact that the frequency characteristic of the first filter 5 illustrated in FIG. 3 has a cutoff frequency of $K/T_q$, when the coefficient K is reduced too much, attention is required to be paid to a fact that a band of the speed controller 4 is apparently reduced due to the frequency characteristic of the first filter 5.

The time constant $T_q$ represents an estimation band of the disturbance observer 9, and is thus required to be set so as to be higher than a frequency of the disturbance, namely, the resonance frequency to be suppressed. However, it is not clear how much the time constant $T_q$ is to be increased with respect to the resonance frequency to be suppressed. When the time constant $T_q$ is unduly increased, a measurement noise contained in the rotational speed $\omega$ is amplified. In view of this, in the first embodiment, the time constant $T_q$ is determined by a method described below. The above-mentioned first effect, namely, the effect of suppressing the peak of the resonance can be achieved by determining the time constant $T_q$ by the method disclosed in the first embodiment.

As illustrated in FIG. 5, a polynomial of the denominator of the transfer function of the controlled object 11 is a third-order equation. Therefore, one of poles is a real root, and remaining two poles are conjugate complex roots in the controlled object 11. When a higher-order vibration mode is taken into consideration, the number of the complex roots increases.

Figure 6:
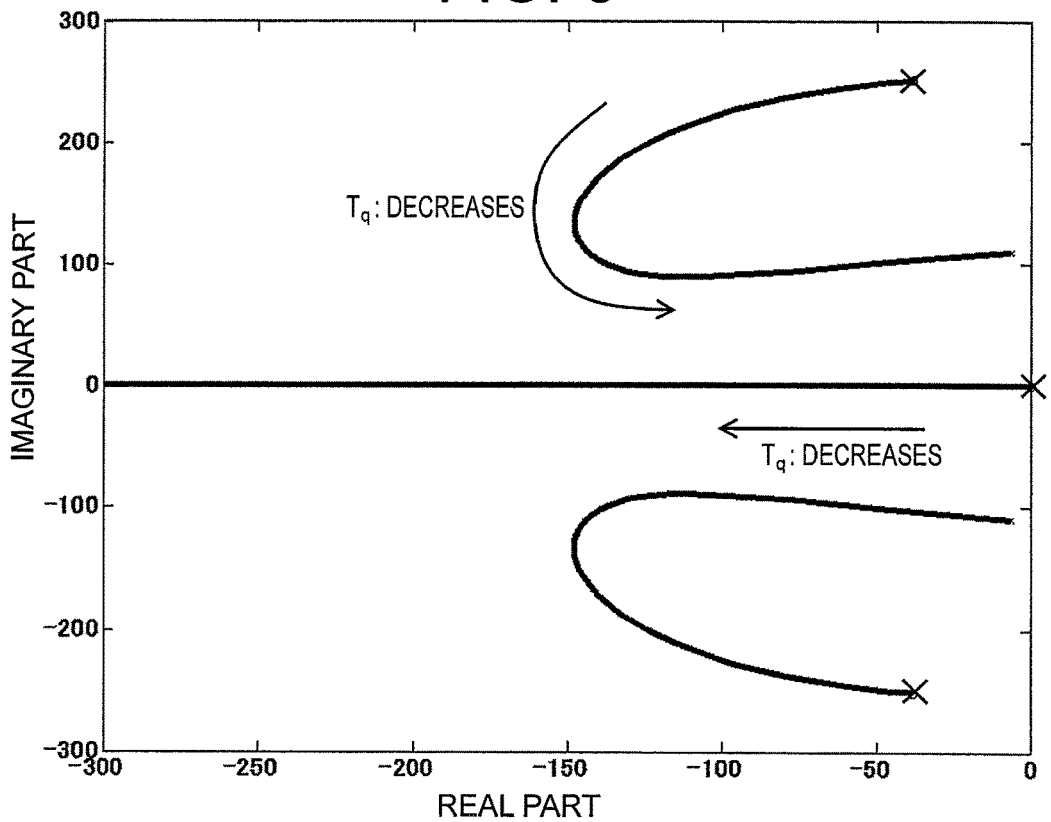
FIG. 6 is a graph for showing loci of poles of a controlled object of FIG. 5 exhibited when a time constant of the controlled object is changed.

FIG. 6 is a graph for showing loci of poles of the controlled object 11 of FIG. 5 exhibited when the time constant $T_q$ of the controlled object 11 is changed.

As shown in FIG. 6, it is appreciated that an argument seen from the real axis decreases, or an argument seen from the imaginary axis increases by changing the time constant $T_q$. This fact is equivalent to a fact that the damping coefficient of the controlled object 11 seen from the speed controller 4 increases. The arguments are angles determined by the real part and the imaginary part of a complex pole.

In this state, the conjugate complex roots constituting the poles determine a resonance characteristic in the transfer characteristic from the operation amount T, which is the output of the speed controller 4, to the rotational speed $\omega$ of the electric motor 1. In the following, such a complex root is referred to as resonant pole, and the two resonant poles are denoted as $p_1$ and $p_2$. Moreover, the damping coefficient $\zeta_d$ and the resonance frequency $\omega_d$ used in the denominator polynomial of the transfer function of the controlled object 11 illustrated in FIG. 5 are hereinafter referred to as damping coefficient $\zeta$ and natural frequency $\omega$, respectively.

The resonant poles $p_1$ and $p_2$ are given by Expression (1).

$$p_1, p_2 = \text{Re} \pm j\text{Im} \tag{1}$$

In Expression (1), Re represents the real part of the resonant pole, Im represents the imaginary part of the resonant pole, and j represents an imaginary unit. The real part Re and the imaginary part Im can be considered as functions of the time constant $T_q$, which is a parameter that can be suitably set. In general, poles of a second-order system are given by Expression (2) when the damping coefficient $\zeta$ and the natural frequency $\omega$ are used.
poles of second-order system=

$$-\zeta\omega \pm j\omega\sqrt{1-\zeta^2} \tag{2}$$

The damping coefficient $\zeta$ can be given by Expression (3) by comparing the coefficients of Expression (1) and Expression (2).

$$\zeta = \frac{1}{\sqrt{1+(Im/Re)^2}} = f(T_q) \qquad (3)$$

Figure 7:
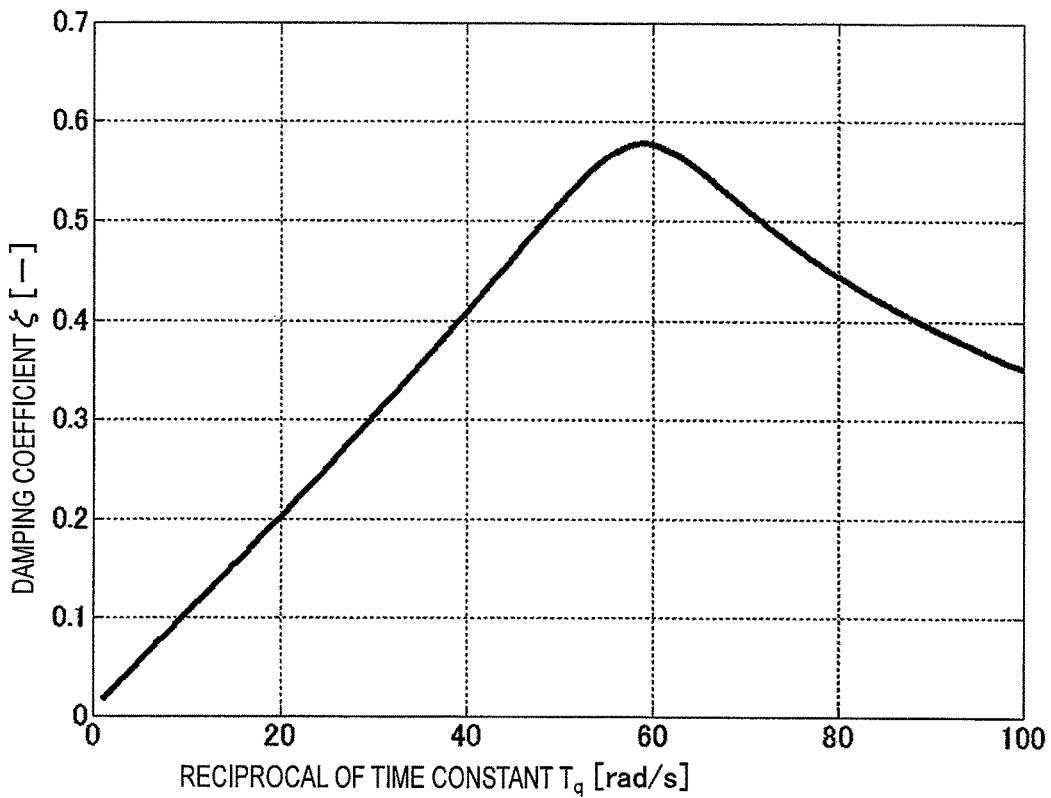
FIG. 7 is a graph for showing an example of a relationship between a damping coefficient and the time constant of the controlled object of FIG. 5.

FIG. 7 is a graph for showing an example of a relationship between the damping coefficient ζ and the time constant $T_q$ of the controlled object 11 of FIG. 5. In FIG. 7, an example of Expression (3) is shown. Further, a reciprocal of the time constant $T_q$ is assigned to a horizontal axis, and the damping coefficient ζ is assigned to a vertical axis.

As shown in FIG. 7, it is appreciated that as the time constant $T_g$ is changed, the damping coefficient ζ reaches the maximum value at a certain time constant $T_q$. The damping coefficient ζ in Expression (3) can be considered as a function $f(T_q)$ of the time constant $T_q$. In view of this, the time constant $T_q$ at which the change of the damping coefficient ζ is 0 is obtained by a relationship given by Expression (4). Consequently, the time constant $T_q$ at which the damping coefficient ζ reaches the maximum value is obtained.

$$\frac{d}{dT_q}\zeta = \frac{d}{dT_q}f(T_q) = 0 \qquad (4)$$

In this manner, the time constant $T_q$ of the first transfer function in the first filter 5 and the time constant $T_q$ of the second transfer function in the second filter 6 are set so as to maximize the damping coefficient ζ, namely, the damping coefficient $\zeta_d$ used in the denominator polynomial of the transfer function from the operation amount T to the rotational speed ω illustrated in FIG. 5.

Figure 8A:
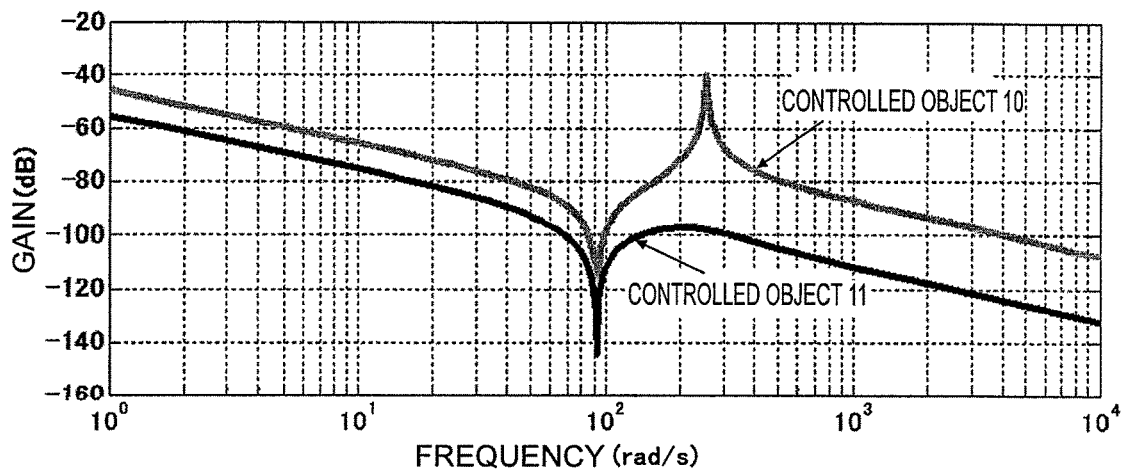
FIG. 8A is a graph for showing a gain characteristic of a controlled object of FIG. 4 and a gain characteristic of a controlled object of FIG. 5.
Figure 8B:
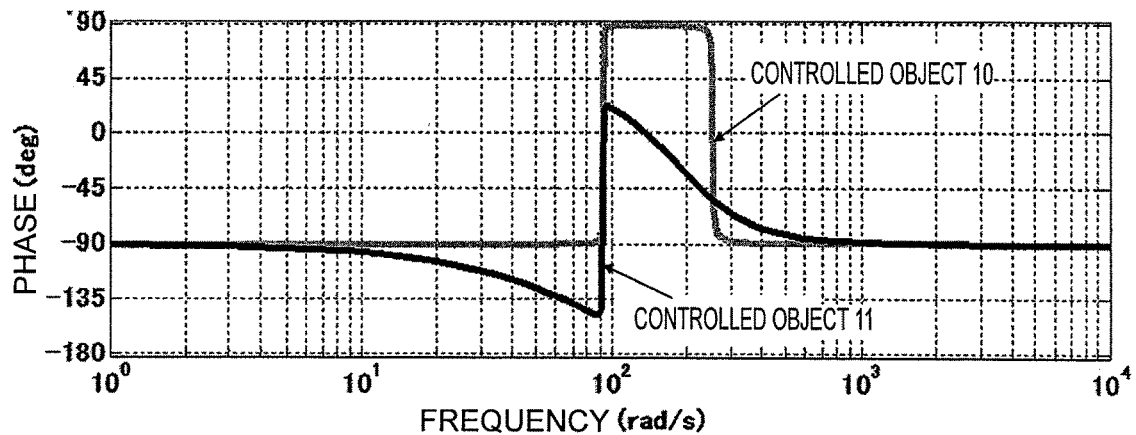
FIG. 8B is a graph for showing a phase characteristic of the controlled object of FIG. 4 and a phase characteristic of the controlled object of FIG. 5.

FIG. 8A is a graph for showing a gain characteristic of the controlled object 10 of FIG. 4 and a gain characteristic of the controlled object 11 of FIG. 5. FIG. 8B is a graph for showing a phase characteristic of the controlled object 10 of FIG. 4 and a phase characteristic of the controlled object 11 of FIG. 5. In FIG. 8A and FIG. 8B, for the sake of comparison, the characteristics of the controlled object 10 and the characteristics of the controlled object 11 using the time constant $T_q$ determined by Expression (4) are simultaneously shown.

As appreciated from FIG. 8A and FIG. 8B, as a result of setting the time constant $T_q$ so as to maximize the damping coefficient ζ of the controlled object 11, the peak of the resonance is suppressed. Thus, the speed controller 4 can be designed without considering the resonance of the electric motor 1 and the load. Therefore, the resonance of the electric motor 1 and the load can be suppressed. As a result, the load can stably be operated. The anti-resonance is determined only by a characteristic of the load, and is thus uncontrollable as seen from the electric motor 1.

In the first embodiment, the case in which Expression (3) and Expression (4) are used to directly calculate the damping coefficient ζ to obtain the time constant $T_q$ is illustrated as an example, but the time constant $T_q$ may be obtained as described below.

That is, the time constant $T_q$ at which the argument from the real axis given by Expression (5) has the minimum value may be obtained, or the time constant $T_q$ may be obtained so as to minimize Im/Re given in Expression (5).

argument from real axis = $\tan^{-1}(Im/Re)$ (5)

Further, the time constant $T_q$ at which the argument from the imaginary axis given by Expression (6) has the maximum value may be obtained, or the time constant $T_q$ may be obtained so as to maximize Re/Im given in Expression (6).

argument from imaginary axis = $\tan^{-1}(Re/Im)$ (6)

Even when the time constant $T_q$ is obtained as described above, the damping coefficient ζ is the maximum, and as a result, a high effect of suppressing the resonance is provided.

In this manner, the peak of the resonance can be suppressed by setting the time constant $T_q$ of the first filter 5 and the second filter 6 so as to maximize the damping coefficient ζ. As a result, the resonance occurring in the electric motor and the load connected to the electric motor 1 can be suppressed, and the control device 3 having high control performance can be provided.

When executing a design by taking even a higher-order vibration mode into consideration, a high effect of suppressing the resonance is provided by such a design as to maximize the damping coefficient ζ of the controlled object 11 determined by the maximum resonance frequency to be suppressed.

Figure 9A:
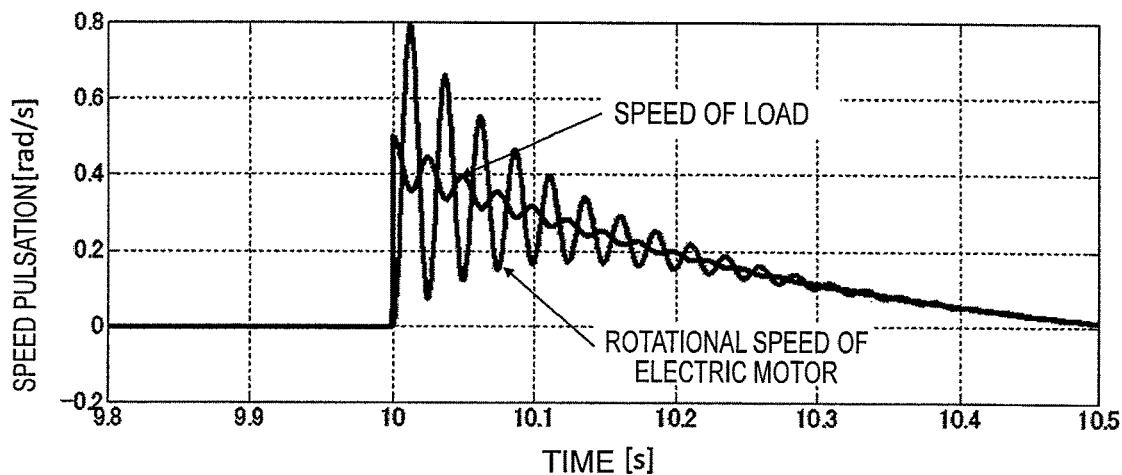
FIG. 9A is a graph for showing a rotational speed of the electric motor and a speed of the load exhibited when the control device of FIG. 1 is not applied.
Figure 9B:
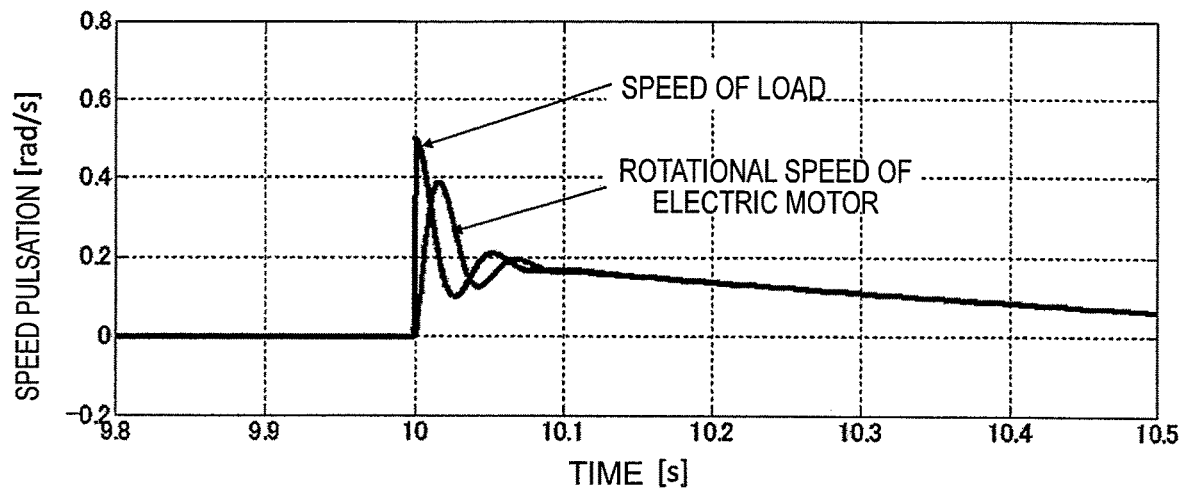
FIG. 9B is a graph for showing the rotational speed of the electric motor and the speed of the load exhibited when the control device of FIG. 1 is applied.

FIG. 9A is a graph for showing the rotational speed of the electric motor and the speed of the load exhibited when the control device 3 of FIG. 1 is not applied. FIG. 9B is a graph for showing the rotational speed of the electric motor and the speed of the load exhibited when the control device 3 of FIG. 1 is applied.

The speed of the load shown in FIG. 9A and FIG. 9B is the speed of a car when the control device 3 is applied to, for example, an elevator. Moreover, in FIG. 9A, there is shown a characteristic obtained when the control device 3 is not used, that is, the first filter 5, the second filter 6, and the control command calculator 7 are not used, and the control is executed by only the speed controller 4. Meanwhile, in FIG. 9B, a characteristic obtained when the control device 3 is applied is shown. Further, the characteristics of FIG. 9A and FIG. 9B are characteristics obtained when stepwise disturbance is applied to the load side of the electric motor 1 while the electric motor 1 is rotating at a constant speed.

When FIG. 9A and FIG. 9B are compared with each other, it is confirmed that the electric motor 1 and the load resonate and vibrate when the disturbance is applied to the load in FIG. 9A, but the electric motor 1 and the load do not resonate and do not vibrate in FIG. 9B. The characteristic shown in FIG. 9B is obtained by setting the time constant $T_q$ of the first filter 5 and the second filter 6 so as to maximize damping coefficient ζ of the controlled object 11, to thereby achieve the effect of suppressing the peak of the resonance.

As described above, the electric motor control device according to the first embodiment includes: the speed controller configured to calculate the operation amount directed to the electric motor, and output the operation amount; the first filter configured to use the operation amount as an input to calculate the first correction amount in accordance with the first transfer function from the operation amount to the first correction amount, and output the first correction amount; the second filter configured to use the rotational speed as an input to calculate the second correction amount in accordance with the second transfer function from the rotational speed to the second correction amount, and output the second correction amount; and the control command calculator configured to add the first correction amount and the second correction amount to one another, to thereby calculate the control command, and output the control command. Moreover, the time constant of the first transfer function in the first filter and the time constant of the second transfer function in the second filter are set so as to maximize the damping coefficient used in the denominator polynomial of the transfer function from the operation amount to the rotational speed.

In this manner, in the control system to which the resonance ratio control is applied, the method of setting the time constant of the filters equivalent to the time constant of the observer of the control system is clear, and hence the control system having high braking performance for the resonance of the electric motor and the load can be achieved. In other words, there can be provided the electric motor control device capable of quickly damping the vibration caused by the resonance even when the resonance of the electric motor and the load occurs.

In the first embodiment, the description has been given of the configuration and effects of the present invention while mentioning the example in which the present invention is applied to the controlled object having one resonance frequency, but the same effects are provided even when the present invention is applied to a controlled object having a higher-order vibration mode.

Second Embodiment

In a second embodiment of the present invention, a description is given of the control device 3 different in configuration from the first embodiment. In the second embodiment, a description is omitted for the same points as those of the first embodiment, and is mainly given of points different from the first embodiment. For the sake of convenience, a symbol having the tilde (~) over a symbol "ω" is referred to as "ω~", a symbol having the hat (^) over a symbol "ω" is referred to as "ω^" and a symbol having the hat (^) over a symbol "a" is referred to as "a^".

Figure 10:
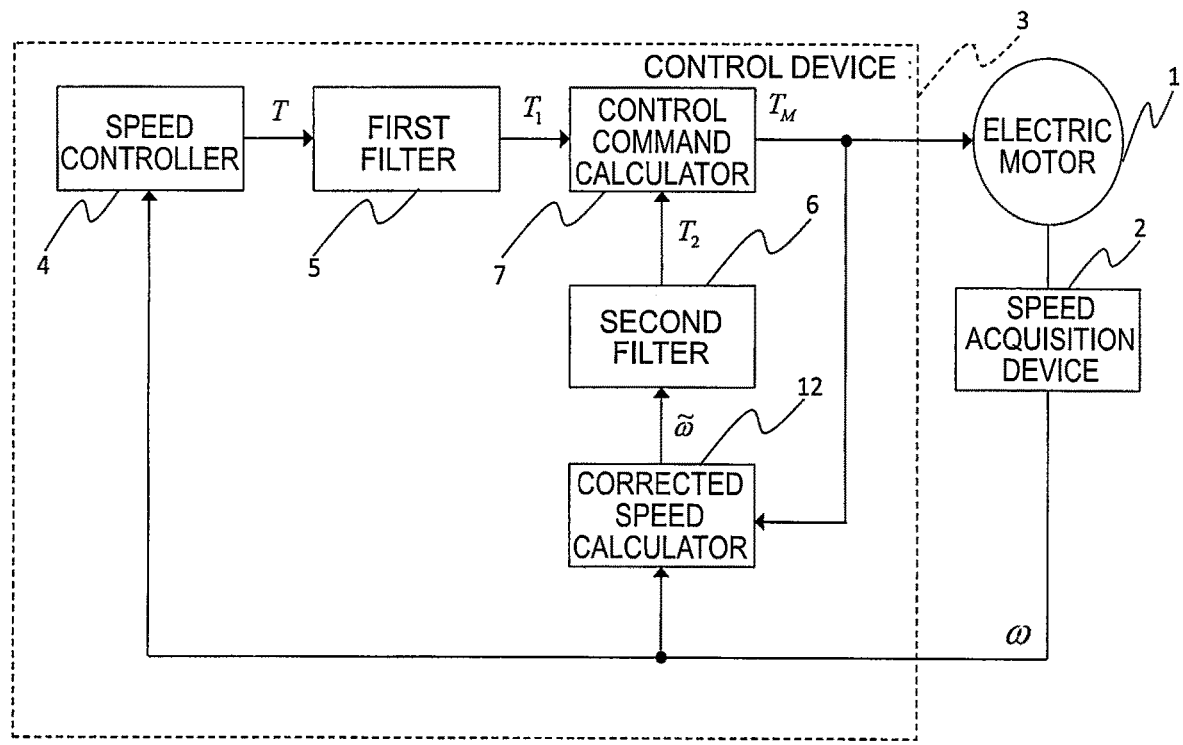
FIG. 10 is a block diagram for illustrating a configuration of an electric motor system including an electric motor control device according to a second embodiment of the present invention.

FIG. 10 is a block diagram for illustrating the configuration of the electric motor system including the electric motor control device 3 according to the second embodiment of the present invention. In FIG. 10, the control device 3 includes the speed controller 4, the first filter 5, the second filter 6, the control command calculator 7, and a corrected speed calculator 12.

Compared with the control device 3 illustrated in FIG. 1, the corrected speed calculator 12 is added to the control device 3 illustrated in FIG. 10. In the control device 3 illustrated in FIG. 10, the components other than the corrected speed calculator 12 execute the same operations as those of the components of the control device 3 illustrated in FIG. 1.

Moreover, as described in the first embodiment, the second filter 6 is the differential filter, and the second filter 6 amplifies the measurement noise contained in the rotational speed ω of the electric motor 1. As a result, the torque command $T_M$ calculated by the control command calculator 7 is vibratory, and the torque generated by the electric motor 1 may thus fluctuate. It is conceivable that the load vibrates due to the influence of the measurement noise, and it is thus required to suppress the measurement noise.

In FIG. 10, the corrected speed calculator 12 calculates a corrected rotational speed ω~ from the rotational speed ω acquired by the speed acquisition device 2 and the torque command $T_M$ output by the control command calculator 7, and outputs the calculated corrected rotational speed ω~. The corrected rotational speed ω~ is a value obtained by removing high frequency components contained in the rotational speed ω of the electric motor 1.

Compared with the first embodiment, the second filter 6 uses the corrected rotational speed ω~ output by the corrected speed calculator 12 as an input, in place of the rotational speed ω acquired by the speed acquisition device 2, to calculate a second correction amount $T_2$ in accordance with the second transfer function, and outputs the calculated second correction amount $T_2$. In this manner, the corrected rotational speed ω~ is input to the second filter 6 in place of the rotational speed ω. Thus, the output of the second filter 6, namely, the second correction amount $T_2$ is less likely to be influenced by the measurement noise, and the vibration of the torque of the electric motor 1 is consequently suppressed.

Figure 11:
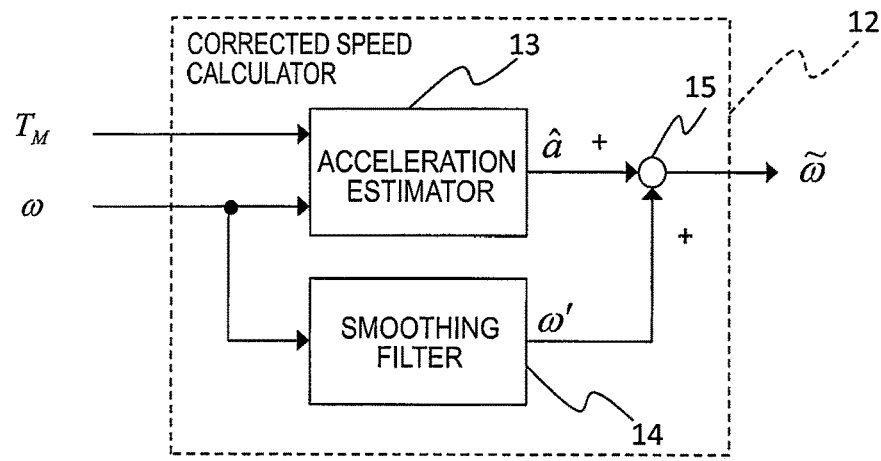
FIG. 11 is a block diagram for illustrating a configuration of a corrected speed calculator of FIG. 10.

Referring to FIG. 11, a description is now given of a configuration of the corrected speed calculator 12. FIG. 11 is a block diagram for illustrating the configuration of the corrected speed calculator 12 of FIG. 10. In FIG. 11, the corrected speed calculator 12 includes an acceleration estimator 13, a smoothing filter 14, and an adder 15.

The acceleration estimator 13 estimates a rotational acceleration estimated value a^, which is an estimated value of the rotational acceleration of the electric motor 1, from the rotational speed ω acquired by the speed acquisition device 2 and the torque command $T_M$ output by the control command calculator 7, and outputs the rotational acceleration estimated value a^.

The smoothing filter 14 uses the rotational speed ω acquired by the speed acquisition device 2 as an input to output a smoothed rotational speed ω' obtained by removing the high frequency components contained in the rotational speed ω. That is, the smoothing filter 14 removes the high frequency components contained in the rotational speed ω, and outputs the rotational speed ω from which the high frequency components have been removed as the smoothed rotational speed ω'.

The smoothing filter 14 is, for example, a low-pass filter, and the order of the filter is not particularly limited. In this case, the smoothed rotational speed ω' is a speed including a time lag with respect to the rotational speed ω of the electric motor 1. Thus, when the smoothed rotational speed ω' is directly input to the second filter 6, a lag occurs in the output of the second filter 6 due to the influence of the time lag, and control performance degrades.

In view of this, the control device 3 is configured to calculate, in consideration of the rotational acceleration estimated value a^ together with the smoothed rotational speed ω', such a corrected rotational speed ω~ as to suppress the time lag while removing the high frequency components from the rotational speed ω. Specifically, the adder 15 adds the rotational acceleration estimated value a^ output by the acceleration estimator 13 and the smoothed rotational speed ω' output by the smoothing filter 14 to each other, to thereby calculate the corrected rotational speed ω~, and outputs the calculated corrected rotational speed ω~.

Figure 12:
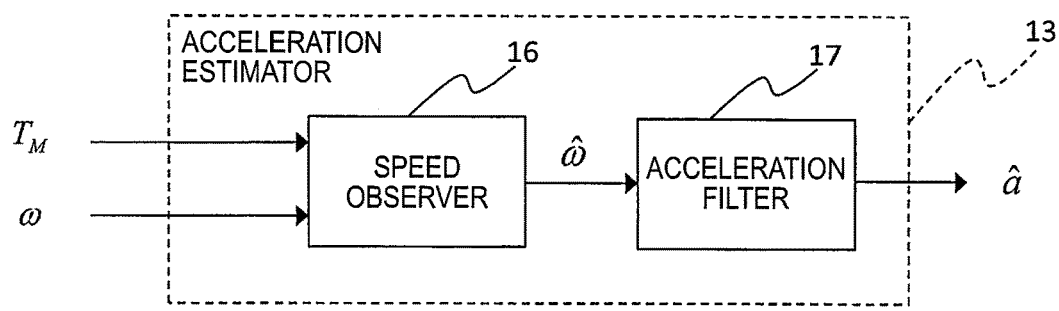
FIG. 12 is a block diagram for illustrating a configuration of an acceleration estimator of FIG. 11.

Referring to FIG. 12, a description is now given of a configuration of the acceleration estimator 13. FIG. 12 is a block diagram for illustrating a configuration of the acceleration estimator 13 of FIG. 11. In FIG. 12, the acceleration estimator 13 includes a speed observer 16 and an acceleration filter 17.

The speed observer 16 estimates a rotational speed estimated value ω^, which is an estimated value of the rotational speed of the electric motor 1, in accordance with the model of the electric motor 1 from the rotational speed ω acquired by the speed acquisition device 2 and the torque command $T_M$ output by the control command calculator 7, and outputs the rotational speed estimated value ω^. Specifically, the speed observer 16 uses, for example, Expression (7) as the model of the electric motor 1.

$$J\dot{\omega} = T_M + T_L \quad (7)$$

In Expression (7), J represents the moment of inertia of the electric motor 1, $T_M$ represents the torque to be generated by the electric motor 1, and $T_L$ represents the load torque acting on the electric motor 1. When the model of the electric motor 1 given by Expression (7) is used to form the speed observer 16, the speed observer 16 estimates the rotational speed estimated value ω^ in accordance with Expression (8).

$$\frac{d}{dt}\begin{bmatrix}\hat{\omega}\\ \hat{T}_L\end{bmatrix} = \begin{bmatrix}0 & 1/J\\ 0 & 0\end{bmatrix}\begin{bmatrix}\hat{\omega}\\ \hat{T}_L\end{bmatrix} + \begin{bmatrix}1/J\\ 0\end{bmatrix}T_M - \begin{bmatrix}L_1\\ L_2\end{bmatrix}(\hat{\omega}-\omega) \quad (8)$$

In Expression (8), $L_1$ and $L_2$ are observer gains, and are used to determine an estimation band of the rotational speed estimated value ω^.

The above-mentioned configuration of the speed observer 16 is only an example, and the speed observer 16 may be configured in any manner as long as the rotational speed estimated value ω^ can be estimated. For example, the speed observer 16 may be configured to estimate the rotational speed through use of electric characteristics of the electric motor 1 by applying a configuration of a so-called magnetic flux observer.

The acceleration filter 17 uses the rotational speed estimated value ω^ output by the speed observer 16 as an input to output the rotational acceleration estimated value a^.

The acceleration filter 17 is a filter having a differential characteristic, and is configured to be able to calculate the rotational acceleration estimated value a^ from the rotational speed estimated value ω^. The acceleration filter 17 is, for example, a high-pass filter, and the order of the filter is not particularly limited. However, the order of the smoothing filter 14 and the order of the acceleration filter 17 are set so as to be the same as one another.

In this state, consideration is given to a case in which a cutoff frequency of the smoothing filter 14 and the cutoff frequency of the acceleration filter 17 are set so as to be the same as one another. In this case, the smoothing filter removes a high-frequency component higher than the cutoff frequency. Moreover, the acceleration filter 17 functions so as to compensate for the high-frequency component removed by the smoothing filter 14. Thus, there is obtained such a corrected rotational speed ω~ as to suppress the time lag while removing the high frequency component. Therefore, the influence of the measurement noise can be suppressed without degrading the control performance.

Figure 13A:
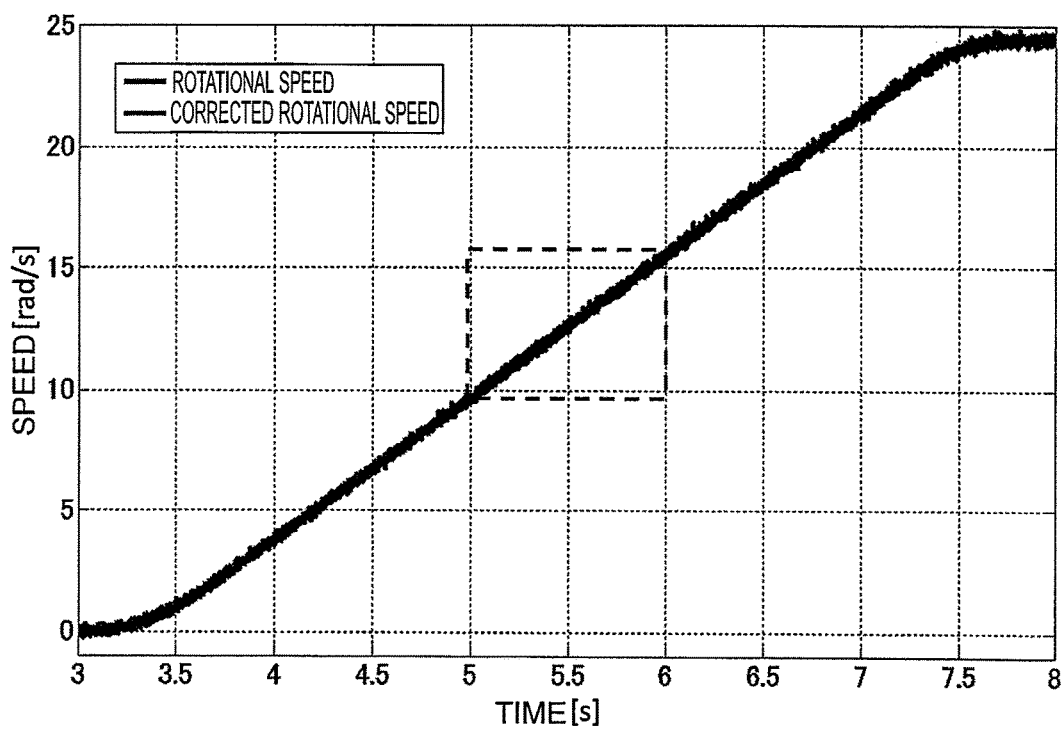
FIG. 13A is a graph for showing time waveforms of a rotational speed input to the corrected speed calculator of FIG. 10 and a corrected rotational speed output by the corrected speed calculator.
Figure 13B:
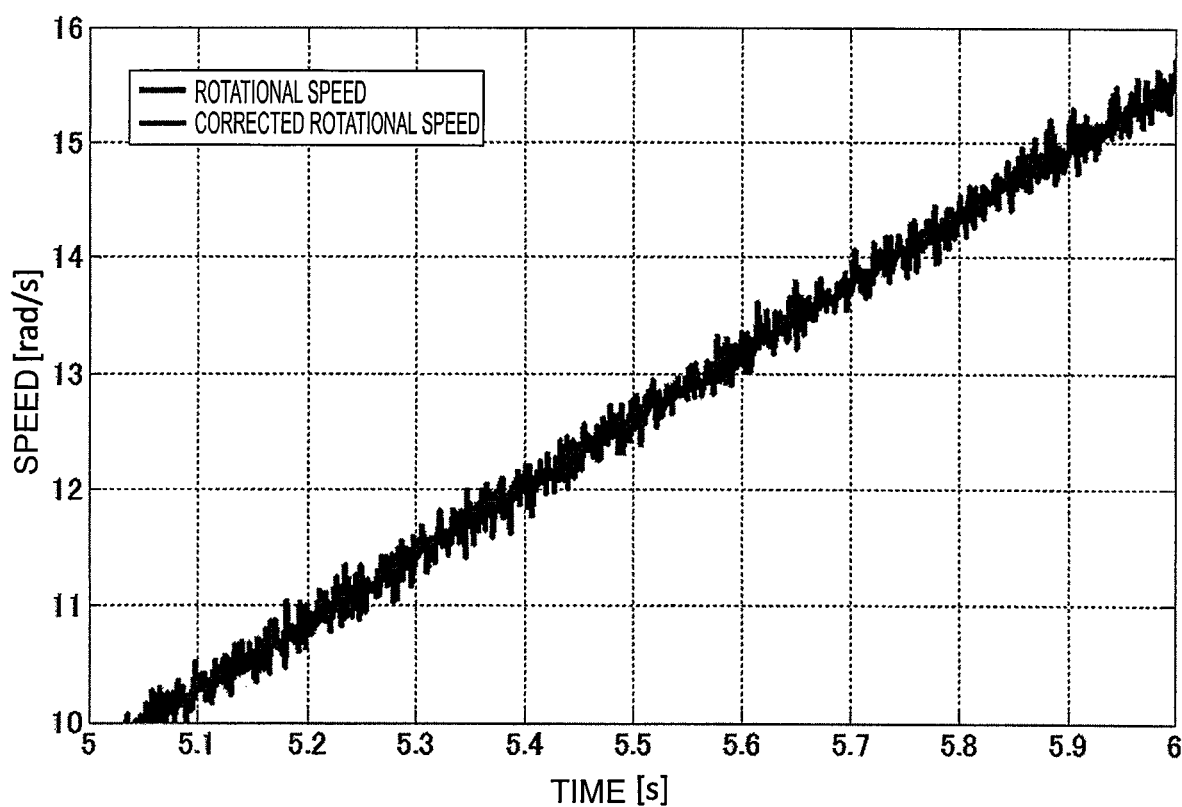
FIG. 13B is a graph for showing an enlarged portion enclosed by the broken lines of FIG. 13A.

Referring to FIG. 13A and FIG. 13B, a time waveform of the rotational speed ω containing the measurement noise and a time waveform of the corrected rotational speed ω~ are compared with each other. FIG. 13A is a graph for showing time waveforms of the rotational speed ω input to the corrected speed calculator 12 of FIG. 10 and the corrected rotational speed ω~ output by the corrected speed calculator 12. FIG. 13B is a graph for illustrating an enlarged portion enclosed by the broken lines of FIG. 13A.

In FIG. 13A, a time history of the rotational speed ω and the corrected rotational speed ω~ exhibited after the rotational speed of the electric motor 1 is started to accelerate until the rotational speed reaches a constant speed.

As appreciated from FIG. 13A and FIG. 13B, when the rotational speed ω and the corrected rotational speed ω~ are compared with each other, the high frequency component contained in the rotational speed ω is removed, and further, the corrected rotational speed ω~ has extremely short time delay with respect to the rotational speed ω.

In this manner, there is provided such a configuration that, in place of the rotational speed ω acquired by the speed acquisition device 2, the corrected rotational speed ω~ output by the corrected speed calculator 12 is input to the second filter 6. Thus, the second correction amount $T_2$ output by the second filter 6 is less likely to be influenced by the measurement noise contained in the rotational speed ω. As a result, the control for the electric motor 1 can be stabilized.

As described above, with the electric motor control device according to the second embodiment, compared with the configuration of the first embodiment, the corrected speed calculator configured to calculate the corrected rotational speed is further provided, and the second filter is configured to use the corrected rotational speed as an input, in place of the rotational speed acquired by the speed acquisition device, to calculate the second correction amount in accordance with the second transfer function. As a result, the same effect as that of the first embodiment is provided, and it is simultaneously expected that the control for the electric motor 1 is further stabilized.

Third Embodiment

In a third embodiment of the present invention, a description is given of the control device 3 in which the configurations of the first filter 5 and the second filter 6 are further devised compared with the first embodiment and the second embodiment. In the third embodiment, a description is omitted for points the same as the first embodiment and the second embodiment, and is mainly given of points different from the first embodiment and the second embodiment.

It is conceivable that when the electric motor 1 starts to accelerate, or the electric motor 1 decelerates and then stops, and such a phenomenon as chattering in which the rotational speed close to the zero speed oscillates occurs, the output of the second filter 6 becomes vibratory, and the electric motor 1 and the load are consequently excited. In view of this, in the third embodiment, the values of the respective time constants of the first filter 5 and the second filter 6 are switched in accordance with the rotational speed ω of the electric motor 1, to thereby stabilize the control for the electric motor 1 even when the rotational speed of the electric motor 1 is a low speed.

Figure 14:
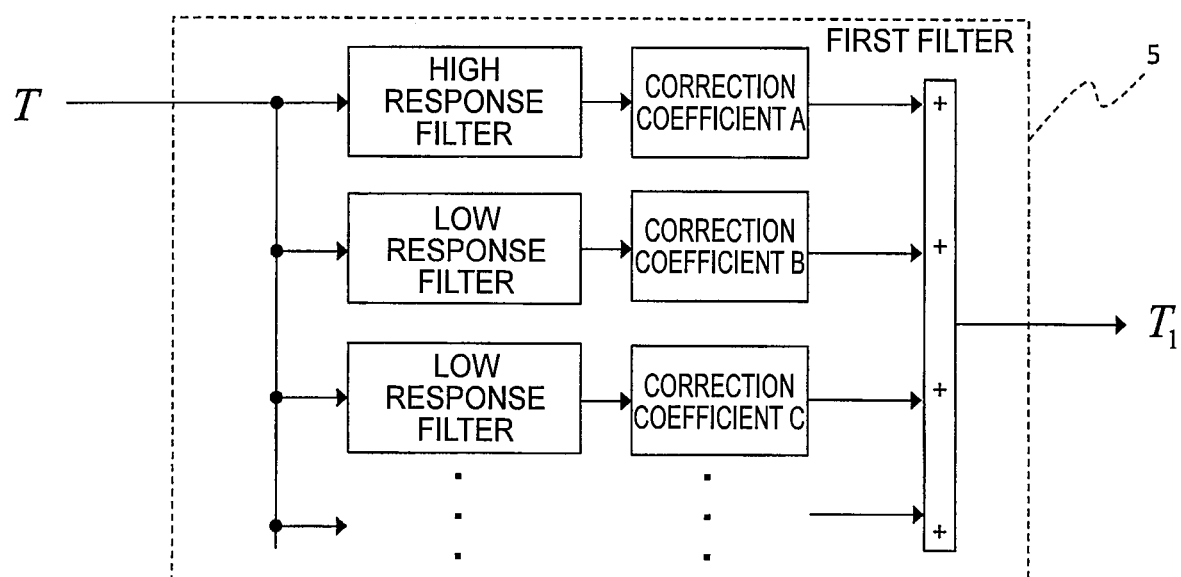
FIG. 14 is a block diagram for illustrating a configuration of a first filter in a third embodiment of the present invention.
Figure 15:
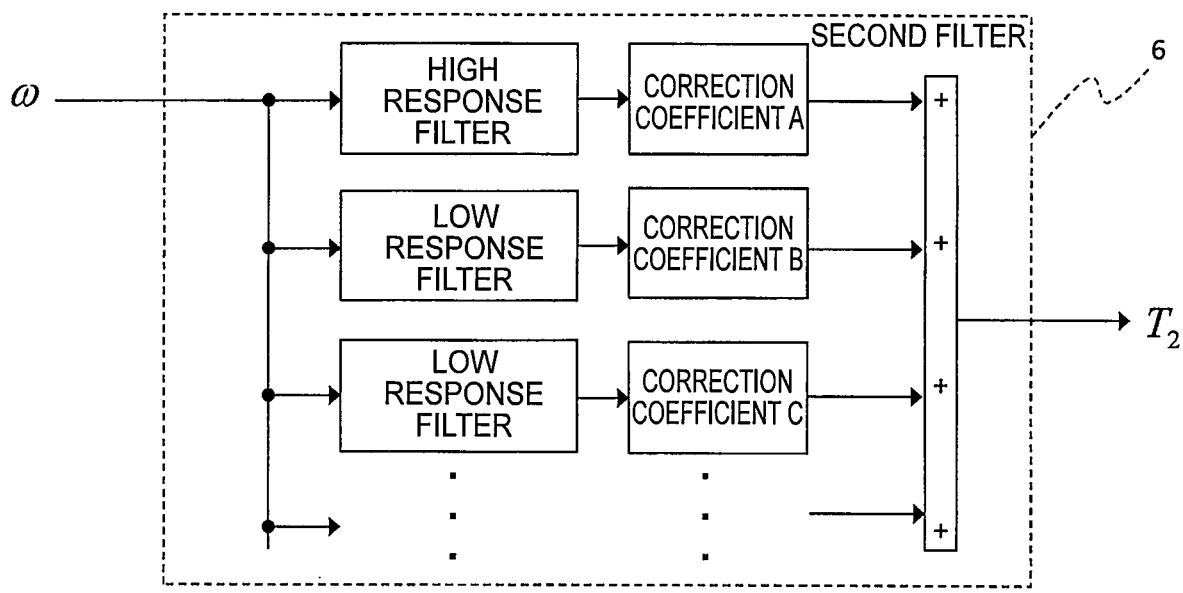
FIG. 15 is a block diagram for illustrating a configuration of a second filter in the third embodiment of the present invention.

FIG. 14 is a block diagram for illustrating a configuration of the first filter 5 in the third embodiment of the present invention. FIG. 15 is a block diagram for illustrating a configuration of the second filter 6 in the third embodiment of the present invention.

In FIG. 14 and FIG. 15, each of the first filter 5 and the second filter 6 has one high response filter and one or more low response filters having time constants different from one another. The high response filter is a filter in which the time constant $T_q$ is set so as to maximize the damping coefficient ζ described in the first embodiment. The low response filter is a filter set so as to be slower in response than the high response filter.

An output of each of the high response filter and the low response filters is multiplied by a correction coefficient. The outputs of the respective filters multiplied by the correction coefficients are added to one another, and an output after the addition is output as the first correction amount $T_1$ or the second correction amount $T_2$.

In this manner, the first filter 5 is configured to multiply the output of each of the high response filter and the low response filters by the correction coefficient, and add the outputs of the respective filters multiplied by the correction coefficients to one another, to thereby calculate the first correction amount $T_1$. Similarly, the second filter 6 is configured to multiply the output of each of the high response filter and the low response filters by the correction coefficient, and add the outputs of the respective filters multiplied by the correction coefficients to one another, to thereby calculate the second correction amount $T_2$.

In this state, as described above, the low response filter is designed so as to be slower in response than the high response filter. This is equivalent to the increasing of the time constant $T_q$ of the disturbance observer 9 illustrated in FIG. 2. With this design, disturbance suppressing performance, namely, resonance suppressing performance slightly decreases, but the electric motor 1 is less likely to respond to a phenomenon, for example, the above-mentioned chattering, and as a result, the excitation of the electric motor 1 and the load can be suppressed. Therefore, even when the rotational speed of the electric motor 1 is a low speed, the control for the electric motor 1 can be stabilized.

Figure 16:
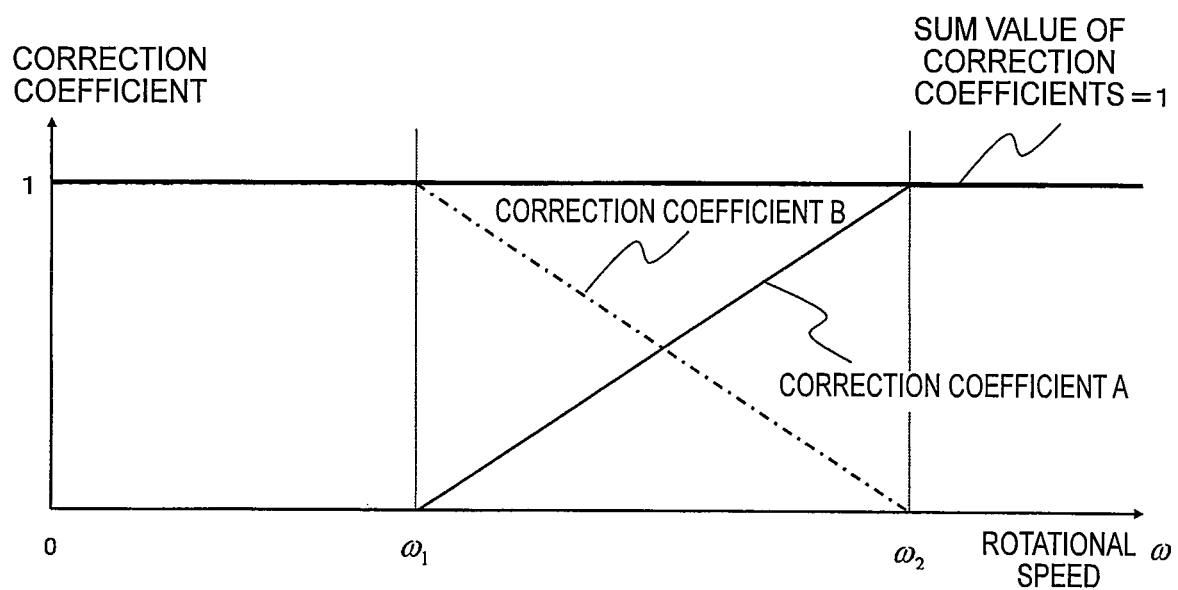
FIG. 16 is a graph for showing a relationship between the rotational speed and correction coefficients by which an output of each of a high response filter and low response filters is multiplied in the third embodiment of the present invention.

Referring to FIG. 16, a description is now given of the correction coefficients by which the output of each of the high response filter and the low response filters is multiplied. FIG. 16 is a graph for showing a relationship between the rotational speed ω and the correction coefficients by which the output of each of the high response filter and the low response filters is multiplied in the third embodiment of the present invention.

In FIG. 16, a case in which the number of the correction coefficients by which the output of each of the high response filter and the low response filters is multiplied, is two is illustrated as an example. In this case, each of the first filter 5 and the second filter 6 is formed of one high response filter and one low response filter. In this state, in order to distinguish the two correction coefficients from one another, the correction coefficient by which the output of the high response filter is multiplied is referred to as correction coefficient A. The correction coefficient by which the output of the low response filter is multiplied is referred to as correction coefficient B.

In FIG. 16, the correction coefficient A and the correction coefficient B are functions of the rotational speed ω of the electric motor 1, respectively. Specifically, the correction coefficient A and the correction coefficient B are set as described below.

That is, the correction coefficient A is "0" until the rotational speed ω reaches $ω_1$, monotonically increases from "0" to "1" as the rotational speed ω increases from $ω_1$ to $ω_2$, and remains to be "1" after the rotational speed ω reaches $ω_2$. The correction coefficient B is "1" until the rotational speed ω reaches col, monotonically decreases from "1" to "0" as the rotational speed ω increases from $ω_1$ to $ω_2$, and remains to be "0" after the rotational speed ω reaches $ω_2$. Moreover, the correction coefficient A and the correction coefficient B are set so that a sum value of the correction coefficient A and the correction coefficient B is always 1 regardless of the rotational speed ω.

As appreciated from FIG. 16, $ω_1$ is a first reference speed, which is a rotational speed serving as a reference for switching the correction coefficient from a constant value to a variable value. $ω_2$ is a second reference speed which is larger than the first reference speed, and serves as a reference for switching the correction coefficient from the variable value to a constant value.

When the rotational speed ω is lower than $ω_1$, the correction coefficient A is "0" and the correction coefficient B is "1". Thus, each of the outputs of the first filter 5 and the second filter 6 is equivalent to the output of the low response filter.

When the rotational speed ω is higher than $ω_1$ and lower than $ω_2$, none of the correction coefficient A and the correction coefficient B is 0, and the sum value thereof is 1. Thus, each of the outputs of the first filter 5 and the second filter 6 is equivalent to an output obtained by composing the output of the high response filter and the output of the low response filters.

When the rotational speed ω is higher than $ω_2$, the correction coefficient A is "1" and the correction coefficient B is "0". Thus, each of the outputs of the first filter 5 and the second filter 6 is equivalent to the output of the high response filter.

By setting the correction coefficient A and the correction coefficient B in this manner, each of the time constants of the first filter 5 and the second filter 6 changes in accordance with the rotational speed ω of the electric motor 1.

That is, when the rotational speed ω is lower than $ω_1$, the first filter 5 and the second filter 6 function as the low response filters, and calculate the first correction amount $T_1$ and the second correction amount $T_2$, respectively. Thus, when the rotational speed ω is lower than $ω_1$, the response is slow, and the electric motor 1 can be set so as to be less likely to respond to a phenomenon, for example, the above-mentioned chattering. As a result, even when the rotational speed of the electric motor 1 is a low speed, the control for the electric motor 1 can be stabilized.

Moreover, as the rotational speed ω increases, the correction coefficients by which the output of each of the high response filter and the low response filters is multiplied change as the functions of the rotational speed ω. When the rotational speed ω exceeds $ω_2$, the first filter 5 and the second filter 6 function as high response filters, and calculate the first correction amount $T_1$ and the second correction amount $T_2$, respectively. Thus, when the rotational speed ω is higher than $ω_2$, the resonance of the electric motor 1 and the load can be suppressed.

The correction coefficients of the first filter 5 and the correction coefficients of the second filter 6 are required to be set so as to be the same as one another. When the correction coefficients are different from one another between the first filter 5 and the second filter 6, and the rotational speed ω exists between $ω_1$ and $ω_2$, the time constants of the first filter 5 and the second filter 6 are different from one another. In this case, the theory of the resonance ratio control is not satisfied, and it is conceived that the control performance degrades.

In this manner, the sum value of the correction coefficients by which the output of each of the high response filter and the low response filters is multiplied is 1 in each of the first filter 5 and the second filter 6. Moreover, the correction coefficients are set as the functions of the rotational speed ω so that each of the first filter 5 and the second filter 6 functions as the low response filter when the rotational speed ω is lower than the first reference speed, and functions as the high response filter when the rotational speed ω is higher than the second reference speed.

Figure 17A:
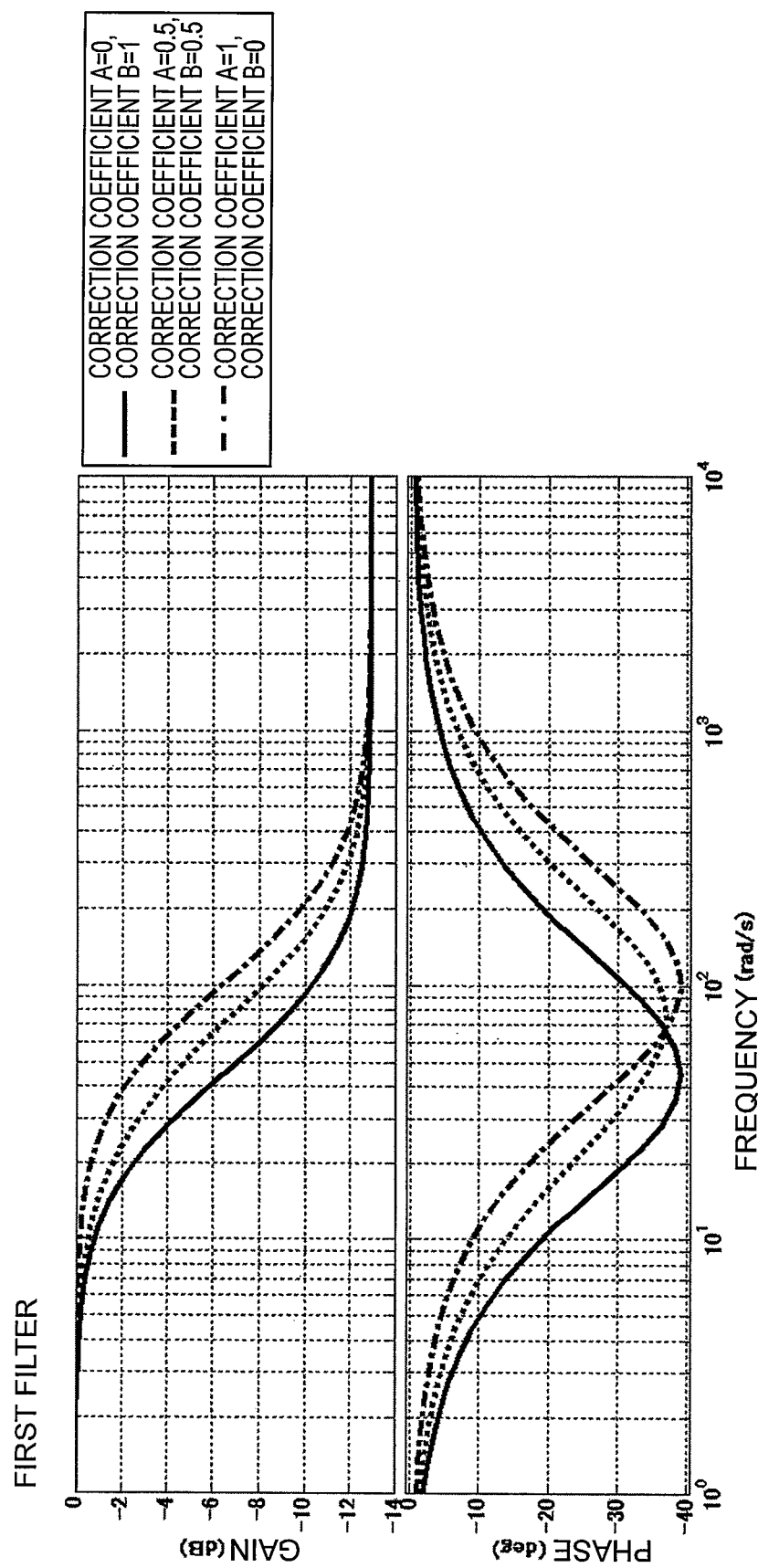
FIG. 17A is a graph for showing a frequency characteristic of the first filter in the third embodiment of the present invention.

Referring to FIG. 17A and FIG. 17B, a description is now given of frequency characteristics of each of the first filter 5 and the second filter 6. FIG. 17A is a graph for showing the frequency characteristics of the first filter 5 in the third embodiment of the present invention. FIG. 17B is a graph for showing the frequency characteristics of the second filter 6 in the third embodiment of the present invention.

In FIG. 17A, the frequency characteristics of the first filter 5 is shown in the case in which the correction coefficient A is "0" and the correction coefficient B is "1", in a case in which both of the correction coefficient A and the correction coefficient B are "0.5", and the case in which the correction coefficient A is "1", and the correction coefficient B is "0", respectively. Similarly, in FIG. 17B, the frequency characteristics of the second filter 6 is shown in the case in which the correction coefficient A is "0" and the correction coefficient B is "1", in the case in which both of the correction coefficient A and the correction coefficient B are "0.5", and the case in which the correction coefficient A is "1", and the correction coefficient B is "0", respectively.

In FIG. 17A and FIG. 17B, the first filter 5 and the second filter 6 function as the low response filters, respectively, in the case in which the correction coefficient A is "0", and the correction coefficient B is "1" as described above. Therefore, the cutoff frequency is set on a low frequency side so that the response is low in each of the first filter 5 and the second filter 6.

When both of the correction coefficient A and the correction coefficient B are "0.5", the cutoff frequency of each of the first filter 5 and the second filter 6 is moved toward the high frequency side.

When the correction coefficient A is "1", and the correction coefficient B is "0", the first filter 5 and the second filter 6 function as the high response filters, respectively. Thus, in this case, compared with the case in which both of the correction coefficient A and the correction coefficient B are "0.5", the cutoff frequency of each of the first filter 5 and the second filter 6 is high.

In the third embodiment, as shown in FIG. 16, the case in which the correction coefficients linearly change in accordance with the rotational speed ω is illustrated as an example, but the correction coefficients may non-linearly change in accordance with the rotational speed ω. Moreover, as shown in FIG. 16, FIG. 17A, and FIG. 17B, the case in which the number of the low response filters forming each of the first filter 5 and the second filter 6 is one is illustrated as an example, but the number may be two or more.

As described above, with the third embodiment, compared with the configurations of the first embodiment and the second embodiment, the first filter is configured to multiply the output of each of the high response filter and the low response filters by the correction coefficients, and then add the output of each of the filters to one another, to thereby calculate the first correction amount, and the second filter is configured to multiply the output of each of the high response filter and the low response filters by the correction coefficients, and then add the output of each of the respective filters to one another, to thereby calculate the second correction amount. As a result, the same effects as those of the first embodiment and the second embodiment are provided, and it is expected that the control for the electric motor 1 is stabilized even when the rotational speed of the electric motor is a low speed.

REFERENCE SIGNS LIST 1 electric motor, 2 speed acquisition device, 3 control device, 4 speed controller, 5 first filter, 6 second filter, 7 control command calculator, 8 resonance ratio gain unit, 9 disturbance observer, 10 controlled object, 11 controlled object, 12 corrected speed calculator, 13 acceleration estimator, 14 smoothing filter, 15 adder, 16 speed observer, 17 acceleration filter

The invention claimed is:

1. An electric motor control device, which is configured to control an electric motor in accordance with a control command, the electric motor control device comprising:
a speed controller circuit configured to calculate an operation amount directed to the electric motor from a rotational speed command for the electric motor and a rotational speed of the electric motor acquired by a speed acquisition device configured to acquire the rotational speed, and output the operation amount;
a first filter configured to use the operation amount output by the speed controller circuit as an input to calculate a first correction amount in accordance with a first transfer function from the operation amount to the first correction amount, and output the first correction amount;
a second filter configured to use the rotational speed acquired by the speed acquisition device as an input to calculate a second correction amount in accordance with a second transfer function from the rotational speed to the second correction amount, and output the second correction amount; and
a control command calculator circuit configured to subtract the second correction amount output by the second filter from the first correction amount output by the first filter, to thereby calculate and output the control command,
wherein a time constant of the first transfer function in the first filter and a time constant of the second transfer function in the second filter are set so as to maximize a damping coefficient used in a denominator polynomial of a transfer function from the operation amount to the rotational speed.

2. The electric motor control device according to claim 1, wherein the first filter is a phase lag compensation filter, and
wherein the second filter is a differential filter.

3. The electric motor control device according to claim 1, further comprising a corrected speed calculator circuit configured to calculate a corrected rotational speed from the rotational speed acquired by the speed acquisition device and the control command output by the control command calculator circuit, and output the corrected rotational speed,
wherein the second filter is configured to use the corrected rotational speed output by the corrected speed calculator circuit as an input, in place of the rotational speed acquired by the speed acquisition device, to calculate the second correction amount in accordance with the second transfer function, and output the second correction amount.

4. The electric motor control device according to claim 3, wherein the corrected speed calculator circuit includes:
an acceleration estimator circuit configured to estimate a rotational acceleration estimated value, which is an estimated value of a rotational acceleration of the electric motor, from the rotational speed acquired by the speed acquisition device and the control command output by the control command calculator circuit, and output the rotational acceleration estimated value;
a smoothing filter configured to use the rotational speed acquired by the speed acquisition device as an input to output a smoothed rotational speed obtained by removing a high-frequency component contained in the rotational speed; and
an adder circuit configured to add the rotational acceleration estimated value output by the acceleration estimator circuit and the smoothed rotational speed output by the smoothing filter to one another, to thereby calculate the corrected rotational speed, and output the corrected rotational speed.

5. The electric motor control device according to claim 4, wherein the acceleration estimator circuit includes:
a speed observer circuit configured to estimate a rotational speed estimated value, which is an estimated value of the rotational speed of the electric motor, in accordance with a model of the electric motor from the rotational speed acquired by the speed acquisition device and the control command output by the control command calculator circuit, and output the rotational speed estimated value; and an acceleration filter configured to use the rotational speed estimated value output by the speed observer circuit as an input to output the rotational acceleration estimated value.

6. The electric motor control device according to claim 5, wherein the smoothing filter comprises a low-pass filter, wherein the acceleration filter comprises a high-pass filter, and wherein a cutoff frequency of the smoothing filter and a cutoff frequency of the acceleration filter are set so as to be the same as one another.

7. The electric motor control device according to claim 1, wherein each of the first filter and the second filter includes:

one high response filter having the time constant set so as to maximize the damping coefficient; and one or more low response filters set so as to be slower in response than the high response filter, wherein the first filter is configured to multiply an output of each of the high response filter and the low response filters by a correction coefficient, and add the outputs of the respective filters multiplied by the correction coefficients to one another, to thereby calculate the first correction amount, and wherein the second filter is configured to multiply an output of each of the high response filter and the low response filters by a correction coefficient, and add the outputs of the respective filters multiplied by the correction coefficients to one another, to thereby calculate the second correction amount.

8. The electric motor control device according to claim 7, wherein a sum value of the correction coefficients by which the output of each of the high response filter and the low response filters is multiplied is 1 for each of the first filter and the second filter.

9. The electric motor control device according to claim 7, wherein the correction coefficient is set as a function of the rotational speed so that each of the first filter and the second filter functions as the low response filter when the rotational speed is lower than a first reference speed, and functions as the high response filter when the rotational speed is higher than a second reference speed higher than the first reference speed.

* * * * *